US 11,904,810 B2

(12) United States Patent
Tessier et al.

(10) Patent No.: US 11,904,810 B2
(45) Date of Patent: Feb. 20, 2024

(54) SYSTEM FOR HANDS-FREE ACCESS TO A VEHICLE

(71) Applicant: VALEO COMFORT AND DRIVING ASSISTANCE, Créteil (FR)

(72) Inventors: Jean-Michel Tessier, Créteil (FR); Nicolas Barbier, Créteil (FR); Nicolas Ronez, Créteil (FR); Sebastien Creiche, Créteil (FR); Evangelino Ribeiro, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 46 days.

(21) Appl. No.: 17/625,891

(22) PCT Filed: Jun. 17, 2020

(86) PCT No.: PCT/EP2020/066830
§ 371 (c)(1),
(2) Date: Jan. 10, 2022

(87) PCT Pub. No.: WO2021/008803
PCT Pub. Date: Jan. 21, 2021

(65) Prior Publication Data
US 2022/0258694 A1 Aug. 18, 2022

(30) Foreign Application Priority Data
Jul. 12, 2019 (FR) ...................... 1907846

(51) Int. Cl.
*B60R 25/24* (2013.01)
*H04B 17/318* (2015.01)
*H04W 4/029* (2018.01)
(52) U.S. Cl.
CPC ......... *B60R 25/245* (2013.01); *H04B 17/318* (2015.01); *H04W 4/029* (2018.02)

(58) Field of Classification Search
None
See application file for complete search history.

(56) References Cited

U.S. PATENT DOCUMENTS

| | | | |
|---|---|---|---|
| 2017/0272907 A1* | 9/2017 | Godet | ............... H04W 4/027 |
| 2020/0269810 A1* | 8/2020 | Godet | ............... H04B 1/3822 |

FOREIGN PATENT DOCUMENTS

| | | |
|---|---|---|
| EP | 1858734 A1 | 11/2007 |
| EP | 2216756 A2 | 8/2010 |
| EP | 2942760 A1 | 11/2015 |

OTHER PUBLICATIONS

International Search Report and Written Opinion in corresponding International Application No. PCT/EP2020/066830, dated Sep. 7, 2020 (13 pages).

\* cited by examiner

*Primary Examiner* — Adolf Dsouza
(74) *Attorney, Agent, or Firm* — Osha Bergman Watanabe & Burton LLP

(57) ABSTRACT

A system for hands-free access to a vehicle includes a hands-free access device that transmits a location frame of a modulated signal and a pure carrier signal, receives a measurement of a received signal strength of a primary received signal performed on the pure carrier signal by a hands-free identifier, and receives information on an absence or presence of noise in the location frame. Additionally, the hands-free access device authorizes or prevents access to the vehicle. The system further includes a hands-free identifier that receives the location frame, performs a measurement of the received signal strength of the primary received signal on the pure carrier signal, sends the hands-free access device the measurement of the received signal strength of the primary received signal, checks the presence of noise in the location frame, and sends the hands-free access device (Continued)

information on the absence or presence of noise in the location frame.

20 Claims, 5 Drawing Sheets

[Fig. 1]
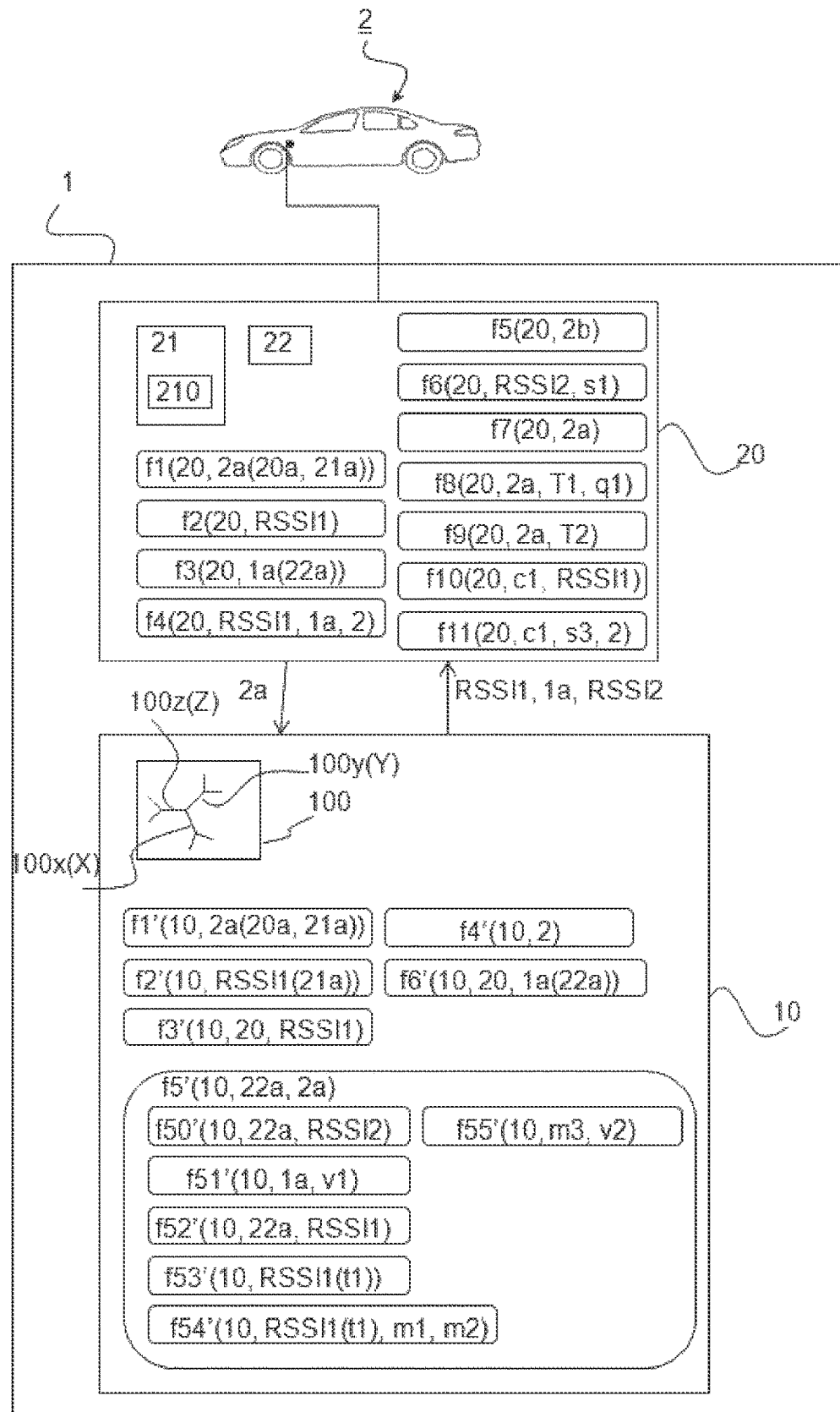

[Fig. 2]
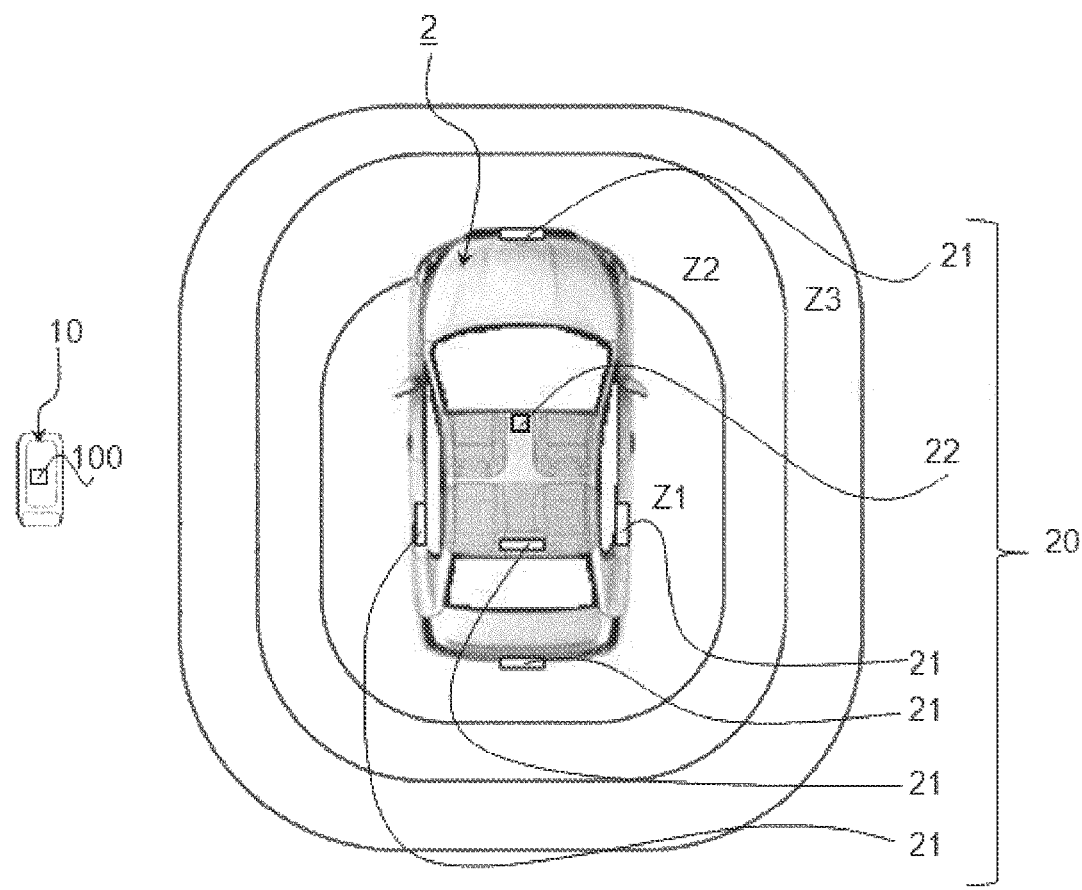

[Fig. 3]
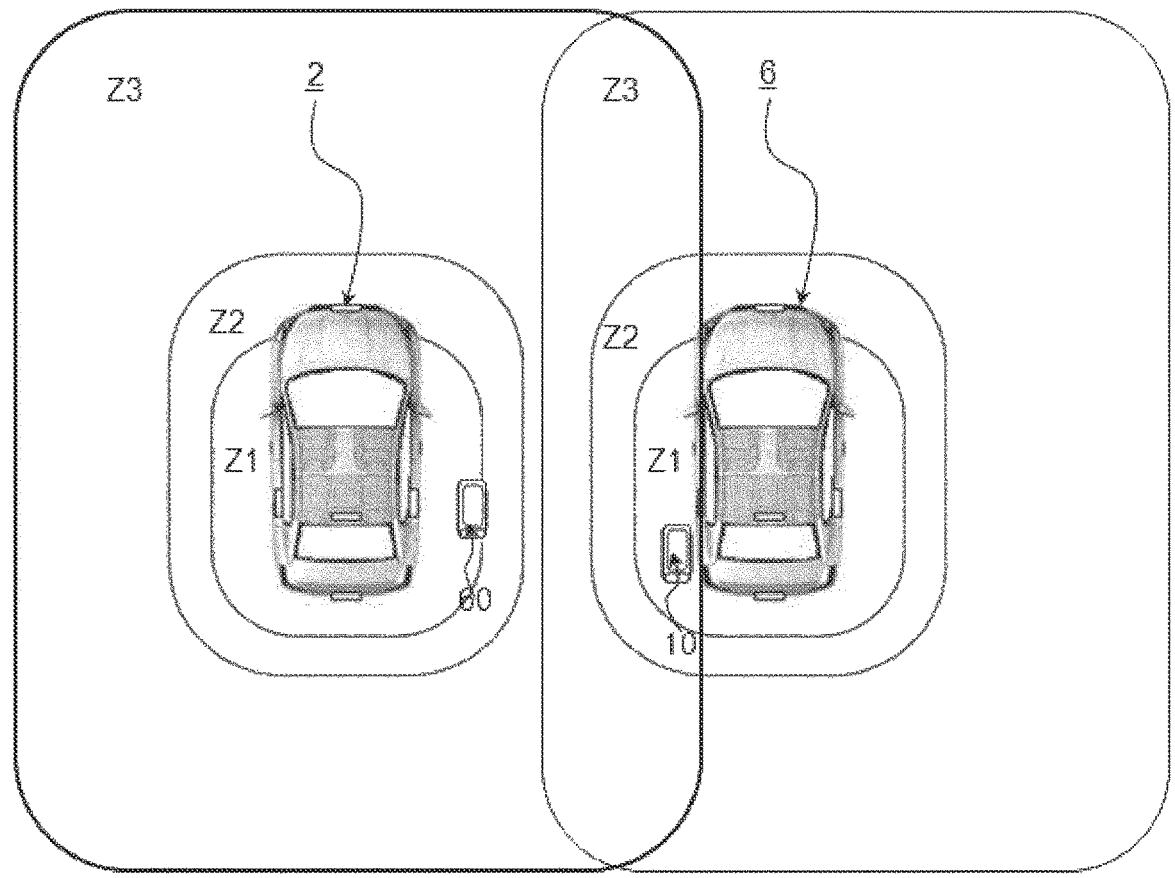
[Fig. 4]
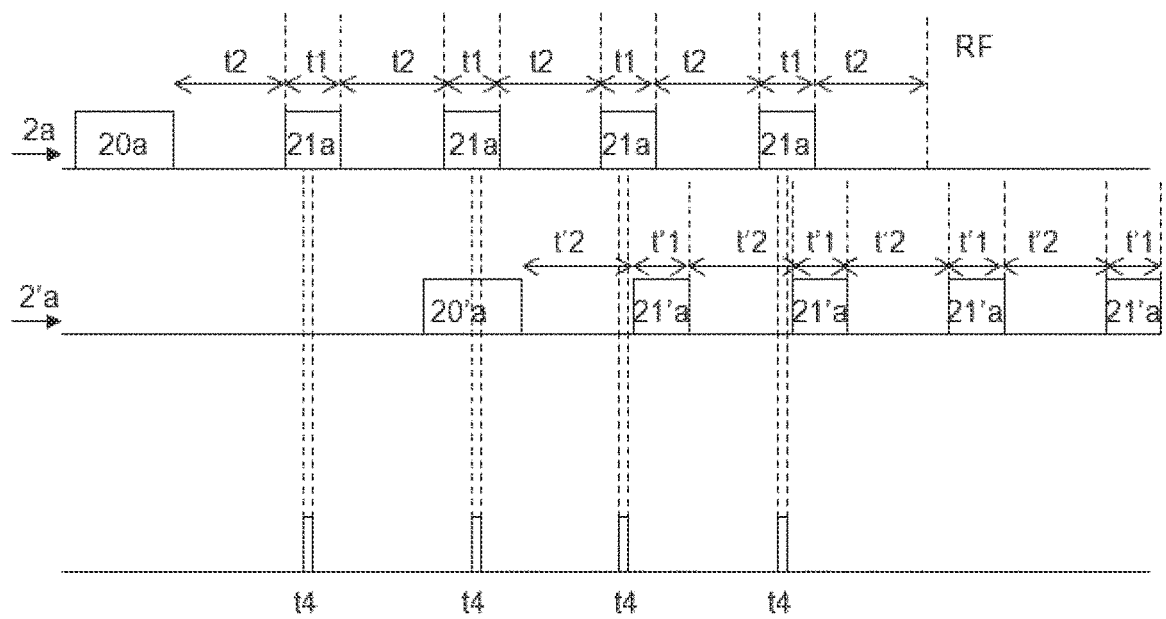

[Fig. 5]
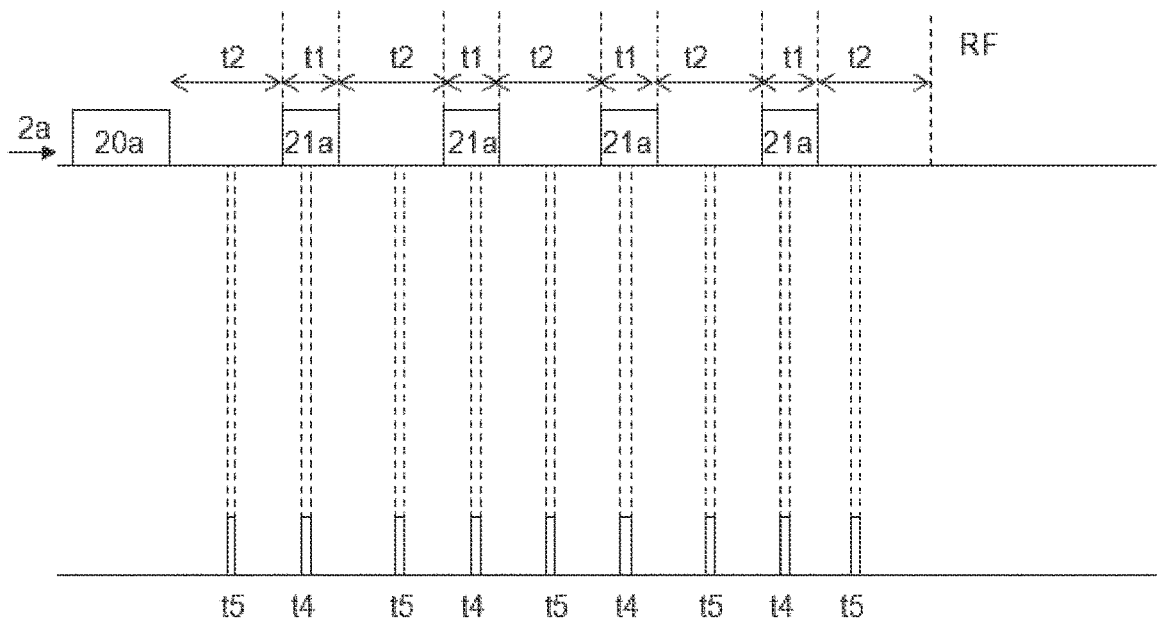
[Fig. 6]
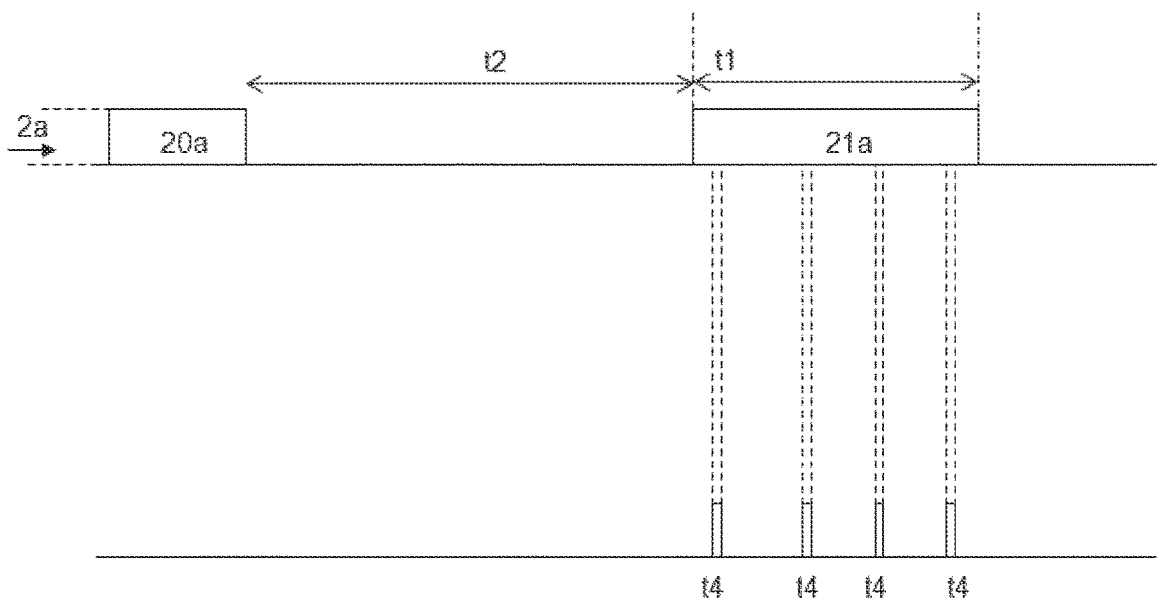

[Fig. 7]
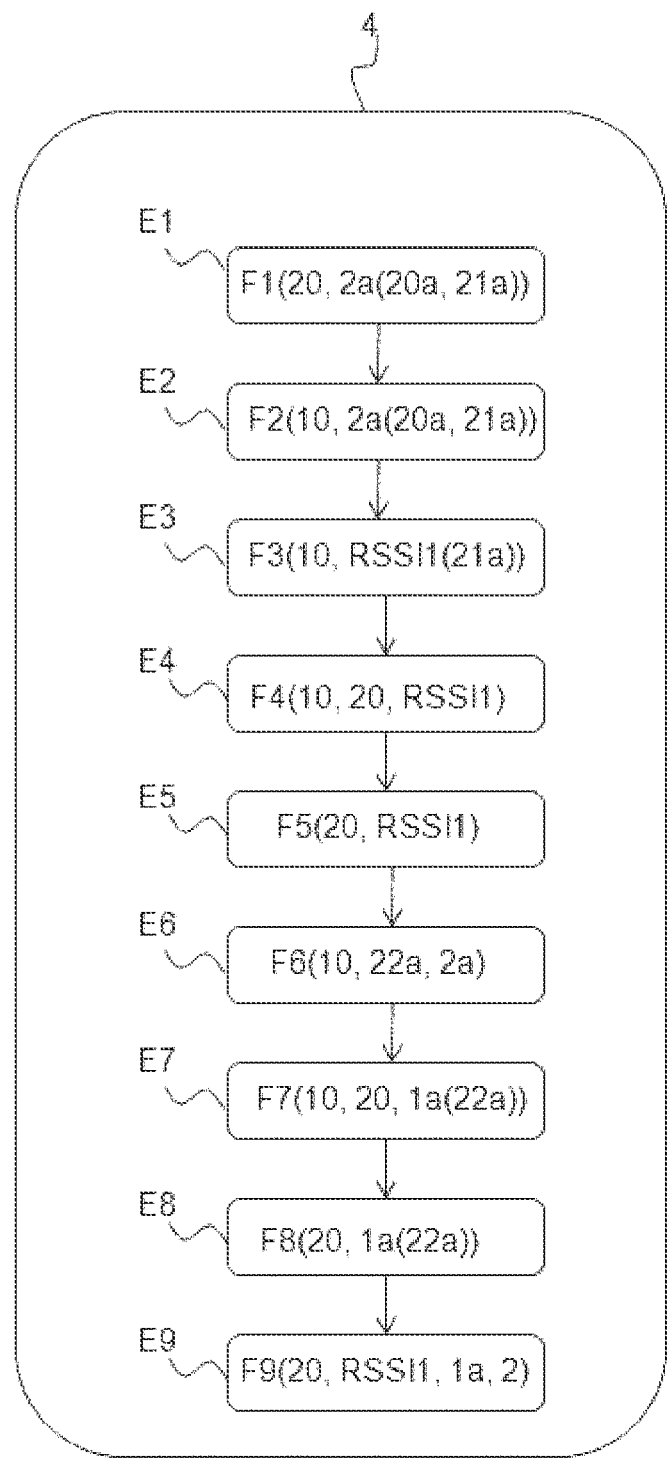

SYSTEM FOR HANDS-FREE ACCESS TO A VEHICLE

The present invention relates to a system for hands-free access to a vehicle. It is particularly applicable, but not limited, to motor vehicles.

Known to those skilled in the art are systems for hands-free access to a motor vehicle comprising a device for hands-free access to the vehicle which transmits a location frame and a hands-free identifier which, after being authenticated with respect to said motor vehicle, performs a measurement of the received signal strength of a received signal, otherwise called an RSSI measurement, on said location frame and sends said RSSI measurement to said hands-free access device. Location regions are defined around the motor vehicle, such as a welcome region, an unlocking region, and a remote locking region. According to said RSSI measurement, the vehicle will deduce therefrom the location region where the hands-free identifier is located. Depending on the location region where the hands-free identifier is located, the motor vehicle makes the decision to lock or to unlock.

One drawback of this prior art is that if another motor vehicle is located close to the motor vehicle in question and also transmits an external signal such as a location frame at the same time as said motor vehicle in question, the hands-free identifier will also pick up this location frame, and will perform an RSSI measurement for this location frame in addition to that of the motor vehicle in question. The hands-free identifier will thus return an erroneous RSSI measurement to said device for hands-free access to the motor vehicle in question and said motor vehicle will make an incorrect decision regarding the authorization to lock or to unlock. Thus, if the hands-free identifier is located in the unlocking region of the other motor vehicle, the device for hands-free access to the motor vehicle in question may believe that said hands-free identifier is located in its own unlocking region, and authorize the unlocking of its doors when it should prevent it.

In that context, the present invention aims to propose a system for hands-free access to a vehicle which overcomes said drawback.

To that end, the invention proposes a system for hands-free access to a vehicle, said hands-free access system comprising:

a. a device for hands-free access to said vehicle configured to:
  transmit a location frame, said location frame comprising a modulated signal and a pure carrier signal transmitted during time windows at different time intervals,
  receive at least one measurement of the received signal strength of a primary received signal performed on said pure carrier signal by a hands-free identifier,
  receive information on the absence or presence of noise in said location frame, said information being sent by said hands-free identifier,
  depending on said at least one measurement of the received signal strength of a primary received signal and on said information on the absence or presence of noise, authorize or prevent access to said vehicle,
b. a hands-free identifier configured to:
  receive said location frame transmitted by said device for hands-free access to said vehicle,
  perform at least one measurement of the received signal strength of a primary received signal on said pure carrier signal of said location frame,
  send said hands-free access device said at least one measurement of the received signal strength of a primary received signal,
  check the presence of noise in said location frame,
  send the hands-free access device information on the absence or presence of noise in said location frame.

Thus, as will be seen in detail below, checking whether there is noise in the location frame transmitted by the motor vehicle will make it possible to know whether another motor vehicle has sent a location frame at the same time and to not unlock the motor vehicle if so.

According to some non-limiting embodiments, the hands-free access system may further comprise one or more of the following additional features taken alone or in any technically possible combination.

According to one non-limiting embodiment, said location frame is a low-frequency frame, and said at least one measurement of the received signal strength of a primary received signal is sent in a radiofrequency frame.

According to one non-limiting embodiment, said hands-free identifier checks the presence of noise by performing at least one measurement of the received signal strength of a secondary received signal between the time windows during the time intervals.

According to one non-limiting embodiment, said at least one measurement of the received signal strength of a secondary received signal is higher than a primary threshold, there is noise.

According to one non-limiting embodiment, said hands-free identifier checks the presence of noise by performing a plurality of measurements of the received signal strength of a primary received signal on said pure carrier signal for at least one given window and by calculating an average over said measurements of the received signal strength of a primary received signal.

According to one non-limiting embodiment, said hands-free identifier performs four measurements of the received signal strength of a primary received signal.

According to one non-limiting embodiment, for each measurement of the received signal strength of a primary received signal, if there is a difference between said measurement of the received signal strength of a primary received signal and said average that is higher than a secondary threshold, there is noise.

According to one non-limiting embodiment, said device for hands-free access to said vehicle is further configured to retransmit said location frame after having received a measurement of the received signal strength of a primary received signal.

According to one non-limiting embodiment, said hands-free access device is further configured to:
  periodically transmit said location frame,
  increment an absence counter if it does not receive any measurement of the strength of a primary received signal from said hands-free identifier,
  if the absence counter exceeds a threshold value, prevent access to said vehicle.

According to one non-limiting embodiment, said hands-free access device is further configured to periodically send said location frame according to a period, said period being changed randomly.

According to one non-limiting embodiment, the vehicle is a motor vehicle.

Also proposed is a hands-free identifier for hands-free access to a vehicle, characterized in that said hands-free identifier is configured to:

receive a location frame sent by a device for hands-free access to said vehicle, said location frame comprising a modulated signal and a pure carrier signal transmitted during time windows at regular time intervals, perform at least one measurement of the received signal strength of a primary received signal on said pure carrier signal of said location frame, return said at least one measurement of the received signal strength of a primary received signal to said hands-free access device, check the presence of noise in said location frame, send said hands-free access device information on the absence or presence of noise.

According to one non-limiting embodiment, said hands-free identifier checks the presence of noise by performing at least one measurement of the received signal strength of a secondary received signal between the time windows during the time intervals.

According to one non-limiting embodiment, if said at least one measurement of the received signal strength of a secondary received signal is higher than a primary threshold, there is noise.

According to one non-limiting embodiment, said hands-free identifier checks the presence of noise by performing a plurality of measurements of the received signal strength of a primary received signal on said pure carrier signal and by calculating an average over said measurements of the received signal strength of a primary received signal.

According to one non-limiting embodiment, for each measurement of the received signal strength of a primary received signal, if there is a difference between said measurement of the received signal strength of a primary received signal and said average that is higher than a secondary threshold, there is noise.

Also proposed is a device for hands-free access to a vehicle, said hands-free access device being configured to:
transmit a location frame, said location frame comprising a modulated signal and a pure carrier signal transmitted during time windows at regular time intervals, receive at least one measurement of the received signal strength of a primary received signal performed on said pure carrier signal by a hands-free identifier, receive information on the absence or presence of noise in said location frame, depending on said at least one measurement of the received signal strength of a primary received signal and on said information on the absence or presence of noise, authorize or prevent access to said vehicle.

According to one non-limiting embodiment, said device for hands-free access to said vehicle is further configured to retransmit said location frame after having received a measurement of the received signal strength of a primary received signal.

According to one non-limiting embodiment, said hands-free access device is further configured to:
periodically transmit said location frame, increment a counter if it does not receive any measurement of the strength of a primary received signal from said hands-free identifier, if the counter exceeds a tertiary threshold, prevent access to said vehicle.

According to one non-limiting embodiment, said hands-free access device is further configured to periodically send said location frame according to a period, said period being changed randomly.

Also proposed is a method for hands-free access to a vehicle, according to which said hands-free access method comprises:
a device for hands-free access to said vehicle transmitting a location frame, said location frame comprising a modulated signal and a pure carrier signal transmitted during time windows at regular time intervals, a hands-free identifier receiving said location frame, said hands-free identifier performing at least one measurement of the received signal strength of a primary received signal on said pure carrier signal of said location frame, said hands-free identifier sending said at least one measurement of the received signal strength of a primary received signal, said hands-free access device receiving said at least one measurement of the received signal strength of a primary received signal, said hands-free identifier checking the presence of noise in said location frame, said hands-free identifier sending said hands-free access device information on the absence or presence of noise in said location frame, said hands-free access device receiving said information on the absence or presence of noise, depending on said at least one measurement of the received signal strength of a primary received signal and on said information on the absence or presence of noise in said location frame, said hands-free access device authorizing or preventing access to said vehicle.

The invention and its various applications will be better understood from reading the following description and examining the accompanying figures:

FIG. 1 schematically illustrates a system for hands-free access to a vehicle, said hands-free access system comprising a device for hands-free access to said vehicle and a hands-free identifier, according to one non-limiting embodiment of the invention, FIG. 2 schematically illustrates said hands-free identifier and said vehicle of FIG. 1 with location regions, according to one non-limiting embodiment, FIG. 3 schematically illustrates said vehicle and said identifier of FIG. 1, said vehicle and said identifier being close to another vehicle, according to one non-limiting embodiment, FIG. 4 schematically illustrates a location frame transmitted by said device for hands-free access to said vehicle of FIG. 1, said location frame comprising a modulated signal and a pure carrier signal transmitted during time windows at different intervals, and times when the hands-free identifier of FIG. 1 will perform a measurement of the received signal strength of a primary received signal on said location frame, according to one non-limiting embodiment, FIG. 5 schematically illustrates a location frame transmitted by said device for hands-free access to said vehicle of FIG. 1, and times when the hands-free identifier of FIG. 1 will perform a measurement of the received signal strength of a primary received signal on said location frame, said times being between said time windows when said pure carrier signal of said location frame is transmitted, according to one non-limiting embodiment, FIG. 6 schematically illustrates a location frame transmitted by said device for hands-free access to said vehicle of FIG. 1, and a time when the hands-free identifier of FIG. 1 will perform four measurements of the received signal strength of a primary received signal on said location frame, according to one non-limiting embodiment, FIG. 7 schematically illustrates a method for hands-free access to a vehicle implemented by said hands-free access system of FIG. 1, according to one non-limiting embodiment.

Elements that are identical, in structure or in function, and that appear in different figures use the same reference signs, unless specified otherwise.

The system 1 for hands-free access to a vehicle 2 is described with reference to FIGS. 1 to 6. In one non-limiting embodiment, the vehicle 2 is a motor vehicle. The term motor vehicle is given to mean any type of motorized vehicle. This embodiment is taken as a non-limiting example throughout the remainder of the description.

In one non-limiting embodiment illustrated in FIG. 1, the hands-free access system 1 comprises:
- a hands-free access device 20 which forms part of the motor vehicle 2,
- a hands-free identifier 10.

The hands-free access device 20 comprises at least one transceiver 21 and an electronic central unit 22. The transceiver 21 comprises an antenna 210. In one non-limiting embodiment, the antenna 210 is a low-frequency antenna, otherwise called an LF antenna. In one non-limiting embodiment, the hands-free access device 20 comprises a plurality of transceivers 21 and therefore a plurality of antennas 210. In the non-limiting example illustrated in FIG. 2, the hands-free access device 20 comprises five transceivers 21.

The hands-free access device 20 is configured to:
transmit a location frame 2a (function illustrated by f1(20, 2a(20a, 21a))), said location frame 2a comprising a modulated signal 20a and a pure carrier signal 21a transmitted during time windows t1 at different time intervals t2. In one non-limiting embodiment, the location frame 2a is transmitted at low frequency. In one non-limiting embodiment, the low frequency is of the order of 125 kHz,
receive at least one measurement of the received signal strength of a primary received signal RSSI1 performed on said pure carrier signal 21a by said hands-free identifier 10 (function illustrated by f2(20, RSSI1)). The measurement of the received signal strength of a primary received signal RSSI1 is otherwise called the primary measurement RSSI1,
receive information 1a on the absence or presence of noise 22a in the location frame 2a (function illustrated by f3(20, 1a(22a))), said information 1a being sent by said hands-free identifier 10,
depending on said at least one measurement of the received signal strength of a primary received signal RSSI1 and on said information 1a on the absence or presence of noise 22a, authorize or prevent access to said motor vehicle 2 (function illustrated by f4(20, RSSI1, 1a, 2)).

In one non-limiting embodiment, said hands-free device 20 is further configured to transmit an identification frame 2b (function illustrated by f5(20, 2b)). In one non-limiting embodiment, this identification frame 2b is transmitted periodically. In one non-limiting embodiment, this identification frame 2b is transmitted at low frequency. In this case, the authentication frame 2b is otherwise called the LF identification frame 2b. This non-limiting embodiment is taken as a non-limiting example throughout the remainder of the description.

The hands-free identifier 10 allows access to the motor vehicle 2. It is also called a passive access identifier. In one non-limiting embodiment, the hands-free identifier 10 may also allow passive starting of the motor vehicle 2. In some non-limiting embodiments, the hands-free identifier 10 is a key or a smartphone. As illustrated in FIG. 1, the hands-free identifier 10 comprises an antenna 100 with three mutually perpendicular coils 100x, 100y, 100z which extend along three mutually perpendicular axes X, Y and Z. These coils make it possible to perform measurements of the received signal strength of a received signal, otherwise called RSSI measurements, along the three axes X, Y and Z.

Depending on where the hands-free identifier 10 is located in relation to the motor vehicle 2, the hands-free device 20 of said motor vehicle 2 will authorize or prevent access to said motor vehicle 2, namely it will lock or unlock the motor vehicle 2, in other words it will lock or unlock the openings (doors, trunk, tailgate) of the motor vehicle 2. As illustrated in FIG. 2, location regions Z are defined around the motor vehicle 2. These location regions Z are:
- a welcome region Z3, otherwise called region Z3. In one non-limiting embodiment, it corresponds to a distance of between approximately 3 to 5 meters around the motor vehicle 2. This welcome region Z3 indicates that the hands-free identifier 10 is present,
- a remote locking region Z2, otherwise called region Z2. In one non-limiting embodiment, it corresponds to a distance of approximately 2 meters around the motor vehicle 2,
- an unlocking region Z1, otherwise called region Z1. In one non-limiting embodiment, it corresponds to a distance of approximately 1.5 meters around the motor vehicle 2.

The hands-free identifier 10 is configured to:
receive said location frame 2a transmitted by said device 20 for hands-free access to said vehicle 2 (function illustrated by f1'(10, 2a(20a, 21a))),
perform at least one measurement of the received signal strength of a primary received signal RSSI1 on said pure carrier signal 21a of said location frame 2a (function illustrated by f2'(10, RSSI1(21a))). It thus takes one or more primary measurements RSSI1 in each time window t1,
send said at least one measurement of the received signal strength of a primary received signal RSSI1 to said hands-free access device 20 (function illustrated by f3'(10, 20, RSSI1)). In one non-limiting embodiment, the primary measurement RSSI1 is sent by radiofrequency, otherwise called RF. In one non-limiting embodiment, the radiofrequency is between 300 and 910 MHz. In one non-limiting variant embodiment, it is equal to 433 MHz or 868 MHz. In another non-limiting variant embodiment, it is equal to 315 MHz. In another non-limiting variant embodiment, it is equal to 902 MHz.

In one non-limiting embodiment, the hands-free identifier 10 is further configured to authenticate itself to said hands-free device 20 of said motor vehicle 2 (function illustrated by f4'(10, 2)). When it identifies itself, it synchronizes with the hands-free device 20 so as to be able to retrieve the pure carrier signal 21a (which is not modulated) of the location frame 2a transmitted during the various time windows U. Furthermore, during identification, the hands-free identifier 10 and the motor vehicle 2 exchange their identification codes. Since they have been paired beforehand, they can thus recognize one other by means of their identification codes.

If the motor vehicle 2 is locked, and there is no hands-free identifier 10 within five meters of the vehicle (therefore no hands-free identifiers 10 in the regions Z1, Z2, Z3), in this case the motor vehicle 2 transmits, via its hands-free device 20, LF identification frames 2b in a periodic manner.

If the hands-free identifier 10 enters the region Z3, it will pick up the LF identification frames 2b of the motor vehicle 2 and will respond by radiofrequency to the motor vehicle 2 in order to authenticate itself. If the hands-free identifier 10 is authenticated, the motor vehicle 2 will transmit, via its hands-free device 20, a new type of frame, namely the location frames 2a. The hands-free identifier 10 will pick up these location frames 2a and return a radiofrequency response containing the measurement of the field emitted by the various antennas 210 of the motor vehicle 2, what is called the primary measurements RSSI1.

The motor vehicle 2 has a table of field levels corresponding to the limit of the various regions Z1, Z2 and Z3 for the various antennas 210. Thus, if the hands-free identifier 10 enters the region Z1, it will measure one or more fields and return it to the motor vehicle 2. These primary fields or measurements RSSI1 are compared with one or more thresholds. If the one or more primary measurements RSSI1 returned are higher than these thresholds, this means that the hands-free identifier 10 has entered the region Z1 and the motor vehicle 2 will be unlocked.

Once the motor vehicle 2 is unlocked, it will periodically transmit location frames 2a again. Again, the hands-free identifier 10 will return primary measurements RSSI1 by radiofrequency, and the motor vehicle 2 will compare these primary measurements RSSI1 with new thresholds which this time will allow the motor vehicle 2 to be locked. Thus, if the hands-free identifier leaves the regions Z1 and Z2 and if it is again in the region Z3, then the one or more primary measurements RSSI1 returned by the hands-free identifier 10 will be lower than one of these thresholds.

The hands-free identifier 10 is further configured to:
- check the presence of noise 22a in said location frame 2a (function illustrated by f5'(10, 22a, 2a)),
- send the hands-free access device 20 information 1a on the absence or presence of noise 22a (function illustrated by f6'(10, 20, 1a(22a))).

This makes it possible to prevent the motor vehicle 2 from being unlocked while the hands-free identifier 10 is in the region Z3 or Z2.

It will be noted that there is noise 22a when an external signal 2a' interferes with the location frame 2a transmitted by the hands-free device 20. An external signal 2a' may come from: —an external jammer which transmits at low frequency, such as, in some non-limiting examples, a smartphone, a computer, a transmission terminal, or any other external device,
- another motor vehicle 6 located close to the motor vehicle 2 as illustrated in FIG. 3. In this case, the external signal 2a' may be a location frame 2a' transmitted by this other motor vehicle 6. If, in one non-limiting example, two motor vehicles 2 and 6 are side by side two meters apart from one another, as illustrated in FIG. 3, the hands-free identifier 10 of the motor vehicle 2 is close to the vehicle 6 and in the region Z3 of the motor vehicle 6. The hands-free identifier 60 of the motor vehicle 6 is close to the motor vehicle 2 and in the region Z3 of the motor vehicle 2. If the motor vehicle 6 transmits a location frame 2a' at the same time as the motor vehicle 2, the field emitted by said location frame 2a' will be superposed over the field emitted by the location frame 2a of the motor vehicle 2, thus generating noise 22a in said location frame 2a of the motor vehicle 2.

A location frame 2a transmitted by the hands-free device 20 of the motor vehicle 2 is illustrated in FIG. 4. It comprises a modulated signal 20a and a pure carrier signal 21a. The latter is transmitted during time windows t1 and at different time intervals t2. In the non-limiting example illustrated, there are four time windows t1 and five time intervals t2, the last time interval t2 being between the last transmission of the pure carrier signal 21a and the response from the hands-free identifier 10, namely the sending of a primary measurement RSSI1 via an RF frame (illustrated by RF in the figure) in the non-limiting example taken. In FIG. 4, a location frame 2a' transmitted by another motor vehicle 6 located close to the motor vehicle 2 is also illustrated. It also comprises a modulated signal 20'a and a pure carrier signal 21'a. The latter is transmitted during time windows t1' and at different time intervals t2'. As can be seen, in the non-limiting example of FIG. 4, the two location frames 2a and 2a' are not synchronized but overlap. In the non-limiting example, the modulated signal 20'a of the location frame 2a' is transmitted at the same time as the transmission of a pure carrier signal 21a of the location frame 2a (the $2^{nd}$ transmission), which will generate noise 22a. FIG. 4 also illustrates the times t4 when the hands-free identifier 10 performs a primary measurement RSSI1 on said location frame 2a, namely during the time windows t1 when the pure carrier signal 21a is transmitted. As can be seen, the hands-free identifier 10 will measure not only the field emitted by the pure carrier signal 21a, but also the noise 22a generated by the motor vehicle 6, during the $2^{nd}$ transmission of the pure carrier signal 21a.

The hands-free identifier 10 is configured to check the presence of noise 22a according to two non-limiting embodiments illustrated in FIGS. 4 and 5 and described below.

As illustrated in FIG. 5, in a first non-limiting embodiment, said hands-free identifier 10 checks the presence of noise 22a by performing at least one measurement of the received signal strength of a secondary received signal RSSI2, otherwise called the secondary measurement RSSI2, between the time windows t1 during the time intervals t2 (sub-function illustrated by f50'(10, 22a, RSSI2)). Thus, it performs additional RSSI measurements at times when there is no field emitted by the motor vehicle 2, namely when there is no transmission of a pure carrier signal 21a. If said at least one measurement of the received signal strength of a secondary received signal RSSI2 is higher than a primary threshold s1, there is noise 22a. FIG. 5 also illustrates the times t4 when the hands-free identifier 10 performs a primary measurement RSSI1 on said location frame 2a at the times when the pure carrier signal 21a is transmitted, and the times t5 when the hands-free identifier 10 performs a secondary measurement RSSI2 on said location frame 2a at the times when the pure carrier signal 21a is not transmitted, namely during the time intervals t2, outside the time windows t1.

In a first non-limiting variant embodiment, the information 1a on the absence or presence of noise 22a comprises all of the secondary measurements RSSI2 performed. Thus, the hands-free identifier 10 informs the hands-free device 20 of the presence or absence of noise 22a by returning all of the secondary measurements RSSI2 performed via an RF frame. The latter checks whether at least one of them is higher than the primary threshold s1 and deduces therefrom whether or not there is noise 22a (function illustrated by f6(20, RSSI2, s1)).

In a second non-limiting variant embodiment, the information 1a on the absence or presence of noise 22a is updated with a primary value v1 which indicates the presence of noise 22a (sub-function illustrated by f51'(10, 1a, v1)). In one non-limiting example, the primary value v1 is equal to seven. Next, the hands-free identifier 10 sends the information 1a on the absence or presence of noise 22a to the hands-free device 20 of the motor vehicle 2 via an RF frame. In one non-limiting example, the primary value v1, here seven in the example of noise 22a, is coded on one bit. In this case, said motor vehicle 2 is aware that there is noise and will not take any action (unlocking or locking), and will wait until the next location frame 2a to act or otherwise. It will be noted that if there is no external signal 2a', then the secondary measurement RSSI2 will be below the primary threshold s1 or even equal to zero.

As illustrated in FIG. 6, in a second non-limiting embodiment, said hands-free identifier 10 checks the presence of noise 22a by performing a plurality of measurements of the received signal strength of a primary received signal RSSI1 on said pure carrier signal 21a (sub-function f52'(10, 22a, RSSI1) and by calculating an average m1 over said measurements of the received signal strength of a primary received signal RSSI1 (sub-function f53'(10, RSSI1(t1), m1)). In one non-limiting embodiment illustrated in FIG. 6, the hands-free identifier 10 performs four measurements of the received signal strength of a primary received signal RSSI1. FIG. 6 illustrates the times t4 when the hands-free identifier 10 performs these four primary measurements RSSI1. This makes it possible to make the measurement of the field more precise. Thus, for each axis X, Y, and Z, and in each time window t1 when the pure carrier signal 21a is transmitted, the hands-free identifier 10 will make four acquisitions in the non-limiting example taken. On the basis of the four measurements, on each axis X, Y and Z, it calculates the average m1 of the four acquisitions for each time window t1. It will be noted that in other non-limiting embodiments, the hands-free identifier 10 may perform two, eight, sixteen etc. primary measurements RSSI1.

Next, for each axis X, Y and Z, for each primary measurement RSSI1 of a time window t1, it calculates the difference m2 between said primary measurement RSSI1 and said average m1 (sub-function f54'(10, RSSI1(t1), m1, m2)). If, for at least three time windows t1 out of four on an axis X, Y or Z, the difference m2 is higher than a secondary threshold s2, this means that there is noise 22a on this axis. If there is noise 22a on at least one of the three axes X, Y, Z, then there is noise 22a.

The hands-free identifier 10 reconstructs the amplitude of the magnetic field by taking the quadratic sum m3 of the averages m1 of all of the time windows, on the three axes X, Y and Z. If there is noise 22a on an axis, in some non-limiting embodiments, the hands-free identifier 10 updates either the average m1 with a secondary value v2 on this axis, or the quadratic sum m3 with a secondary value v2 (sub-function illustrated by f55'(10, m3, v2)). In one non-limiting example, this secondary value v2 is equal to zero.

The information 1a on the absence or presence of noise 22a is thus equal to the quadratic sum m3. If the information 1a on the absence or presence of noise 22a is equal to zero, this indicates that the primary measurement RSSI1 has been interfered with by an external signal 2a'.

Next, the hands-free identifier 10 sends the information 1a on the absence or presence of noise 22a to the hands-free device 20 of the motor vehicle 2. The information 1a on the absence or presence of noise 22a is returned via an RF frame. In this case, said motor vehicle 2 is aware that there is noise 22a and will not take any action (unlocking or locking), and will wait until the next location frame 2a to act or otherwise.

It will be noted that it is possible that a motor vehicle 6 transmit a location frame 2a' by chance at the same time as the location frame 2a transmitted by the motor vehicle 2, although said external signal 2a' is transmitted at a different frequency from the location frame 2a, and said external signal 2a' and the location frame 2a are not synchronized. If an external signal 2a', such as a location frame 2a' from another motor vehicle 2, is by chance transmitted exactly at the same time as the location frame 2a of the motor vehicle 2 (the two location frames 2a, 2a' are synchronized by chance), this leads to interference between the two motor vehicles 2 and 6, and the first embodiment described will not allow the hands-free identifier 10 to measure noise 22a between the transmissions of the pure carrier signal 21a, namely between the time windows t1, since there will be no noise 22a between said time windows t1. However, during one of the time windows t1 when the pure carrier signal 21a is transmitted, the hands-free identifier 10 will measure the field of the external signal 2a' which will be superposed over that of the pure carrier signal 21a of the location frame 2a, which might again lead to an incorrect decision from the motor vehicle 2.

To remedy this problem, in one non-limiting embodiment, the hands-free device 20 of the motor vehicle 2 is further configured to retransmit a location frame 2a immediately (for example after a delay of 50 ms to 100 ms) after having received a response from the identifier 10 (namely after having received a primary measurement RSS1) to confirm the primary measurement RSSI1 performed for each time window t1 (function illustrated by f7(20, 2a)). It will be noted that the other motor vehicle 6 will generally not be synchronized with the motor vehicle 2. Therefore, in general the location frame 2a' will not be transmitted at the same transmission frequency as the location frame 2a. In this case, on the next transmission of the location frame 2a, the location frame 2a' will be offset differently with respect to the location frame 2a, and the modulated signal 20'a or the pure carrier signal 21'a of the location frame 2a' will fall between the time windows t1 of the location frame 2a. Therefore, if there is noise 22a, the new primary measurement RSSI1 on the new transmission of the location frame 2a will be different from that performed on the first transmission of the location frame 2a. In one non-limiting embodiment, the location frame 2a is retransmitted once, and therefore it is transmitted twice in a row. If the hands-free identifier 10 is deemed to be outside the regions Z1 or Z2 after both transmissions, this means that there is noise 22a or that it is outside these regions Z1 or Z2. Thus, this makes it possible to combat noise 22a that is asynchronous with respect to the pure carrier signal 21a of the location frame 2a.

It will be noted that it is possible that a motor vehicle 6 transmit a location frame 2a' at exactly the same frequency as the location frame 2a transmitted by the motor vehicle 2, the external signal 2a' and the location frame 2a thus being synchronized. Thus, if an external signal 2a', such as a location frame 2a' from another motor vehicle 2, is transmitted exactly at the same time as the location frame 2a of the motor vehicle 2, this leads to interference between the two motor vehicles 2 and 6, and the first embodiment described will not allow the hands-free identifier 10 to measure noise 22a between the transmissions of the pure carrier signal 21a, namely between the time windows t1, since there will be no noise 22a between said time windows t1.

To remedy this problem, in one non-limiting embodiment, the transmission period T1 between two location frames 2a is changed randomly. In this case, the transmission of the next location frame 2a and 2a' from the two motor vehicles 2 and 6 does not take place at the same time. Consequently, the two motor vehicles 2 and 6 no longer interfere with one another. Thus, the hands-free access device 20 is further configured to periodically send said location frame 2a according to a period T1, said period T1 being changed randomly (function illustrated by f8(20, 2a, T1, q1) with a determined random variable q1. In one non-limiting embodiment, the period T1 is about three hundred milliseconds. In one non-limiting embodiment, the determined random variable q1 is between 0 and 50 ms. Thus, this makes it possible to offset the transmission periods for the location frame 2a with respect to an external signal 2a', and thus to have a transmission frequency specific to the motor vehicle 2. Thus, this makes it possible to combat noise 22a that is synchronous with respect to the pure carrier signal 21a of the location frame 2a.

It will be noted that in the case where the hands-free identifier 10 receives an external signal 2a' that is too strong, such as noise from an external jammer, which is transmitted while the location frame 2a of the motor vehicle 2 is being transmitted, said hands-free identifier 10 may not be able to decode said location frame 2a, namely in particular to retrieve the pure carrier signal 21a of said location frame 2a, because it is subject to too much interference from the external signal 2a'. In this case, it will not be able to respond to the motor vehicle 2 and return primary measurements RSSI1. The motor vehicle 2 will then consider the hands-free identifier 10 as being absent from the region Z1, from the region Z2 and from the region Z3. In order to be sure that the hands-free identifier 10 is absent, in one non-limiting embodiment, the motor vehicle 2 will use an absence counter c1. After a certain number of tests equal to a tertiary threshold s3, when the hands-free identifier 10 does not respond, the motor vehicle 2 will consider the hands-free identifier 10 as being truly absent, and it will be able to make its decision such as, for example, to lock. Thus, this makes it possible to confirm the absence of the hands-free identifier 10 from one of the regions 21, Z2 or Z3.

Thus, in one non-limiting embodiment, said hands-free access device 20 is further configured to:
- periodically transmit said location frame 2a (function f9(20, 2a, T2),
- increment an absence counter c1 if it does not receive any measurement of the strength of a primary received signal RSSI1 from said hands-free identifier 10 (function f10(20, c1, RSSI1)),
- if the absence counter c1 exceeds a tertiary threshold s3, prevent access to said vehicle 2 (function 111(20, c1, s3, 2)).

Thus, for example if the motor vehicle 2 was unlocked, the hands-free device 20 will lock the motor vehicle 2. This non-limiting embodiment makes it possible to have additional protection in locking the motor vehicle 2 and to provide robustness in access to the motor vehicle 2.

Thus, the described system 1 for hands-free access to a motor vehicle 2 is configured to implement a method 4 for hands-free access to a motor vehicle 2. The hands-free access method 4 is illustrated in FIG. 7 and comprises the following steps:

In a step E1) illustrated by F1(20, 2a(20a, 21a)), the device 20 for hands-free access to said vehicle 2 transmits a location frame 2a, said location frame 2a comprising a modulated signal 20a and a pure carrier signal 21a transmitted during time windows t1 at different time intervals t2. The time intervals t2 are regular. The time windows t1 are regular. The time intervals t2 and the time windows t1 may be equal or different.

In a step E2) illustrated by F2(10, 2a(20a, 21a)), the hands-free identifier 10 receives the location frame 2a transmitted by the hands-free device 20 of the motor vehicle 2.

In a step E3) illustrated by F3(10, RSSI1(21a)), the hands-free identifier 10 performs at least one measurement of the received signal strength of a primary received signal RSSI1 on said pure carrier signal 21a of said location frame 2a.

In a step E4) illustrated by F4(10,20, RSSI1), the hands-free identifier 10 sends the hands-free device 20 said at least one measurement of the received signal strength of a primary received signal RSSI1. The sending is performed via an RF frame using the identification code of the motor vehicle 2.

In a step E5) illustrated by F5(20, RSSI1), the hands-free access device 20 receives said at least one measurement of the received signal strength of a primary received signal RSSI1.

In a step E6) illustrated by F6(10, 22a, 2a)), the hands-free identifier 10 checks the presence of noise 22a in said location frame 2a.

In a step E7) illustrated by F7(10, 20, 1a(22a)), the hands-free identifier 10 sends said hands-free access device 20 information 1a on the absence or presence of noise 22a in said location frame 2a.

In a step E8) illustrated by F8(20, 1a(22a)), the hands-free access device 20 receives said information 1a on the absence or presence of noise 22a.

In a step E9) illustrated by F9(20, RSSI1, 1a, 2), depending on said at least one measurement of the received signal strength of a primary received signal RSSI1 and on said information 1a on the absence or presence of noise 22a in said location frame 2a, the hands-free device 20 authorizes or prevents access to said vehicle 2. Thus, if the information 1a on the absence or presence of noise 22a indicates that there is noise 22a, the hands-free device 20 does not authorize the unlocking of the motor vehicle 2 if the motor vehicle 2 was previously locked, or the hands-free device 20 locks the motor vehicle 2 if the motor vehicle 2 was previously unlocked.

It will be noted that steps E3 and E6 are carried out during the transmission of a location frame 2a. Furthermore, steps E4 and E7 are carried out at the same time.

If the information 1a on the absence or presence of noise 22a indicates that there is no noise 22a, on the basis of the primary measurements RSSI1 performed, the hands-free device 20 defines the distance between the hands-free identifier 10 and said motor vehicle 2 and deduces therefrom the location region Z1, Z2, or Z3 to which it belongs. Depending on the location region Z1, Z2 or Z3 where the hands-free identifier 10 is located, the hands-free device 20 authorizes or prevents access to the motor vehicle 2. It will be noted that in another non-limiting embodiment, it is the hands-free identifier 10 which defines the distance from the motor vehicle 2 and which returns this distance to the hands-free device 20 which makes the decision to authorize or prevent access to the motor vehicle 2. Since the calculation of a distance with respect to an RSSI measurement is well known to those skilled in the art, it is not described here.

Of course, the description of the invention is not limited to the embodiments described above and to the field described above.

Thus, the invention described has the following advantages in particular:

it makes it possible to see whether there is noise in a location frame 2a, in particular when the pure carrier signal 21a of said location frame 2a is transmitted, or outside of transmissions thereof, it makes it possible to prevent access to the motor vehicle 2 when there is an external source, such as another motor vehicle 6, which is transmitting an external signal 2a' at the same time as the motor vehicle 2. It thus prevents the motor vehicle 2 from making an incorrect decision, namely unwanted locking or unlocking.

The invention claimed is:

1. A system for hands-free access to a vehicle, said hands-free access system comprising:
a hands-free access device of said vehicle configured to:
transmit a location frame, said location frame comprising a modulated signal and a pure carrier signal transmitted during time windows at different time intervals,
receive at least one measurement of a received signal strength of a primary received signal performed on said pure carrier signal by a hands-free identifier, and
receive information on an absence or presence of noise in said location frame, said information being sent by said hands-free identifier,
wherein, depending on said at least one measurement of the received signal strength of a primary received signal and on said information on the absence or presence of noise, authorize or prevent access to said vehicle,
a hands-free identifier configured to:
receive said location frame transmitted by said hands-free access device of said vehicle,
perform at least one measurement of the received signal strength of a primary received signal on said pure carrier signal of said location frame,
send said hands-free access device said at least one measurement of the received signal strength of a primary received signal,
check the presence of noise in said location frame, and
send the hands-free access device information on the absence or presence of noise in said location frame.

2. The hands-free access system as claimed in claim 1, wherein said location frame is a low-frequency frame, and said at least one measurement of the received signal strength of a primary received signal is sent in a radiofrequency frame.

3. The hands-free access system as claimed in claim 1, wherein said hands-free identifier checks the presence of noise by performing at least one measurement of the received signal strength of a secondary received signal (RSSI2) between the time windows during the time intervals.

4. The hands-free access system as claimed in claim 3, wherein if said at least one measurement of the received signal strength of a secondary received signal is higher than a primary threshold, there is noise.

5. The hands-free access system as claimed in claim 1, wherein said hands-free identifier checks the presence of noise by performing a plurality of measurements of the received signal strength of a primary received signal on said pure carrier signal for at least one given window and by calculating an average over said measurements of the received signal strength of a primary received signal.

6. The hands-free access system as claimed in claim 5, wherein said hands-free identifier performs four measurements of the received signal strength of a primary received signal.

7. The hands-free access system as claimed in claim 6, wherein for each measurement of the received signal strength of a primary received signal, if there is a difference between said measurement of the received signal strength of a primary received signal and said average that is higher than a secondary threshold, there is noise.

8. The hands-free access system as claimed in claim 1, wherein said hands-free access device is further configured to retransmit said location frame after having received a measurement of the received signal strength of a primary received signal.

9. The hands-free access system as claimed in claim 1, wherein said hands-free access device is further configured to:
periodically transmit said location frame,
increment an absence counter if the hands-free access device does not receive any measurement of the strength of a primary received signal from said hands-free identifier, and
prevent access to said vehicle if the absence counter exceeds a threshold value.

10. The hands-free access system as claimed in claim 1, wherein said hands-free access device is further configured to periodically send said location frame according to a period, said period being changed randomly.

11. A hands-free identifier for hands-free access to a vehicle, said hands-free identifier being configured to:
receive a location frame sent by a hands-free access device of said vehicle, said location frame comprising a modulated signal and a pure carrier signal transmitted during time windows at regular time intervals,
perform at least one measurement of a received signal strength of a primary received signal on said pure carrier signal of said location frame,
return said at least one measurement of the received signal strength of a primary received signal to said hands-free access device,
check a presence of noise in said location frame, and
send said hands-free access device information on an absence or presence of noise.

12. The hands-free identifier as claimed in claim 11, wherein said hands-free identifier checks the presence of noise by performing at least one measurement of the received signal strength of a secondary received signal between the time windows during the time intervals.

13. The hands-free identifier as claimed in claim 12, wherein if said at least one measurement of the received signal strength of a secondary received signal is higher than a primary threshold, there is noise.

14. The hands-free identifier as claimed in claim 11, wherein said hands-free identifier checks the presence of noise by performing a plurality of measurements of the received signal strength of a primary received signal on said pure carrier signal and by calculating an average over said measurements of the received signal strength of a primary received signal.

15. The hands-free identifier as claimed in claim 14, wherein for each measurement of the received signal strength of a primary received signal, if there is a difference between said measurement of the received signal strength of a primary received signal and said average that is higher than a secondary threshold, there is noise.

16. A hands-free access device of a vehicle, said hands-free access device being configured to:
   transmit a location frame, said location frame comprising a modulated signal and a pure carrier signal transmitted during time windows at regular time intervals,
   receive at least one measurement of a received signal strength of a primary received signal performed on said pure carrier signal by a hands-free identifier, and
   receive information on an absence or presence of noise in said location frame,
   wherein, depending on said at least one measurement of the received signal strength of a primary received signal and on said information on the absence or presence of noise, authorize or prevent access to said vehicle.

17. The hands-free access device as claimed in claim 16, wherein said hands-free access device is further configured to retransmit said location frame after having received a measurement of the received signal strength of a primary received signal.

18. The hands-free access device as claimed in claim 16, wherein said hands-free access device is further configured to:
   periodically transmit said location frame,
   increment a counter if the hands-free access device does not receive any measurement of the strength of a primary received signal from said hands-free identifier, and
   prevent access to said vehicle if the counter exceeds a tertiary threshold.

19. The hands-free access device as claimed in claim 16, wherein said hands-free access device is further configured to periodically send said location frame according to a period, said period being changed randomly.

20. A method for hands-free access to a vehicle, wherein said hands-free access method comprises:
   transmitting, by a hands-free access device, a location frame to said vehicle, said location frame comprising a modulated signal and a pure carrier signal transmitted during time windows at regular time intervals;
   receiving, by a hands-free identifier said location frame;
   performing, by said hands-free identifier at least one measurement of a received signal strength of a primary received signal on said pure carrier signal of said location frame;
   sending, by said hands-free identifier said at least one measurement of the received signal strength of a primary received signal;
   receiving, by said hands-free access device said at least one measurement of the received signal strength of a primary received signal;
   checking, by said hands-free identifier a presence of noise in said location frame;
   sending, by said hands-free identifier said hands-free access device information on an absence or presence of noise in said location frame;
   receiving, by said hands-free access device, said information on the absence or presence of noise; and
   authorizing or preventing access to said vehicle depending on said at least one measurement of the received signal strength of a primary received signal and on said information on the absence or presence of noise in said location frame.

\* \* \* \* \*